United States Patent
Nakahara et al.

(10) Patent No.: US 6,623,820 B1
(45) Date of Patent: Sep. 23, 2003

(54) SILICA-ALUMINA COMPOSITE SOL, PROCESSES FOR PRODUCING THE SAME, AND RECORDING MEDIUM

(75) Inventors: Katsumasa Nakahara, Chiba (JP); Noriko Torimoto, Chiba (JP); Hachiro Hirano, Chiba (JP); Toshiya Matsubara, Kanagawa (JP); Shinichi Suzuki, Kanagawa (JP); Hisao Inokuma, Chiba (JP); Hirokazu Wakabayashi, Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/463,965

(22) PCT Filed: Jun. 10, 1999

(86) PCT No.: PCT/JP99/03112

§ 371 (c)(1),
(2), (4) Date: Feb. 11, 2000

(87) PCT Pub. No.: WO99/64354

PCT Pub. Date: Dec. 16, 1999

(30) Foreign Application Priority Data

Aug. 26, 1998 (JP) ............................................ 10-240714
Jun. 12, 1998 (JP) ............................................ 10-165526

(51) Int. Cl.[7] ................................................ B23B 3/00
(52) U.S. Cl. .................................. 428/32.37; 106/286.8
(58) Field of Search ................................ 428/195, 323, 428/32.34, 32.37; 406/122, 286.8

(56) References Cited

U.S. PATENT DOCUMENTS

| 5,472,757 | A | * | 12/1995 | Ogawa et al. | ............... | 427/361 |
| 5,576,088 | A | * | 11/1996 | Ogawa et al. | ............... | 428/327 |
| 5,679,451 | A | * | 10/1997 | Kondo et al. | ............ | 428/304.4 |
| 5,731,261 | A | * | 3/1998 | Balducci et al. | ............ | 502/439 |
| 5,750,200 | A | * | 5/1998 | Ogawa et al. | ............... | 427/361 |
| 6,000,794 | A | * | 12/1999 | Kondo et al. | ................ | 347/105 |

FOREIGN PATENT DOCUMENTS

| EP | 0 442 268 | 8/1991 |
| GB | 1 265 550 | 3/1972 |
| GB | 1 344 288 | 1/1974 |
| JP | 7-10522 | 1/1995 |
| JP | 10-86509 | 4/1998 |
| JP | 10-152315 | 6/1998 |

OTHER PUBLICATIONS

Grant & Hackh's Chemical Dictionary (5th ed.), McGraw–Hill, Inc (1987), p 540.*

* cited by examiner

Primary Examiner—Bruce H. Hess
Assistant Examiner—Michael Grendzynski
(74) Attorney, Agent, or Firm—Oblon, Spivak, McClelland, Maier & Neustadt, P.C.

(57) ABSTRACT

It is an object of the present invention to obtain a composite sol capable of forming an ink-receiving layer having a high transparency and a high property for fixing dyes. The present invention provides a sol which is a colloidal solution having aggregate particles containing silica and alumina dispersed in an aqueous medium, wherein the silica is such that the primary particles are spherical and the average particle size of the primary particles is from 2 to 200 nm, the average particle size of the aggregate particles is at least twice the average particle size of the silica primary particles and at most 1,000 nm, the ζ-potential of the aggregate particles is at least +10 mV, and the pH of the solution is from 3 to 9. The present invention provides a method for producing a silica-alumina composite sol, which comprises gradually adding an aluminum salt of which the liquid exhibits acidity when dissolved in water, to a silica sol, and a method for producing a silica-alumina composite sol, which comprises mixing a silica sol with an alumina sol having a specific surface area of a xerogel obtainable by drying of at least 150 $m^2/g$, to form aggregate particles containing silica and alumina, followed by peptization treatment.

22 Claims, No Drawings

SILICA-ALUMINA COMPOSITE SOL, PROCESSES FOR PRODUCING THE SAME, AND RECORDING MEDIUM

TECHNICAL FIELD

The present invention relates to a silica-alumina composite sol and a method for producing it. Particularly, it relates to a silica-alumina composite sol suitable for forming an ink-receiving layer of a recording medium for an ink jet printer, a method for producing it and a recording medium.

BACKGROUND ART

In recent years, reflecting wide use of digital cameras and computers, the hard copy technology to record images thereof on e.g. paper sheets has been rapidly developed. As hard copy recording systems, various systems have been known including not only a system wherein a display indicating an image is directly photographed by silver halide photography, but also a sublimation type thermal transfer system and an ink jet system.

Among these, an ink jet system is a system wherein ink droplets comprising dyes and a large amount of a solvent are ejected at a high speed from nozzles to a recording medium. An ink jet printer has been widely used in recent years, since full coloring and high-speed printing are easy, and the printing noise is low.

As the recording medium for an ink jet printer, in order to quickly absorb inks and to present a clear image, one having a substrate such as a paper sheet or a film, and a porous ink-receiving layer comprising inorganic fine particles of e.g. silica or alumina and a binder such as a polyvinyl alcohol, formed on the substrate has been known. The recording medium for an ink jet printer is required to absorb a large amount of the solvent contained in the ink, in the pores in the ink-receiving layer. Accordingly, the ink-receiving layer is required to have an appropriate pore size and a large pore volume. Further, the more transparent the ink-receiving layer is, the higher the color density will be, whereby a clearer image will be formed. Accordingly, one having a high transparency is preferred as the ink-receiving layer.

Further, since aqueous inks are employed for the ink jet recording system, it becomes important that even if exposed to water after formation of the image, the ink-receiving layer will have no defect in appearance, or the inks will not bleed due to flow of the dyes in the inks (hereinafter referred to as water resistance), quality of the recorded product will not deteriorate by scuffs generated when the surface of the recording medium is in contact with some sharp-edged stuff (hereinafter referred to as scuffing resistance), and the degree of glossiness on the surface is high (hereinafter referred to as glossiness), in addition to the above-mentioned ink absorptivity and transparency.

A silica type material such as a silica gel has pores in moderation. However, the surface of the particles of silica is usually negatively charged, and silica does not absorb an acid dye or a direct dye having anionic dissociative groups, to be used for ink jet, and silica has a low water resistance.

Accordingly, a method as disclosed in JP-A-60-257286, wherein polyaluminum chloride is contained in the ink-receiving layer, is mentioned. However, since the polyaluminum chloride is a water-soluble salt, the polyaluminum chloride in the ink-receiving layer itself dissolves in water, thus generating defects in appearance in a form of pits on the surface of the ink-receiving layer, and the water resistance is not necessarily adequate. Further, in a case of a long-term preservation, the polyaluminum chloride undergoes migration to clog the pores of the ink-receiving layer, thus decreasing the ink absorptivity.

Further, a method for producing a colloidal silica sol charged positively, by coating the surface of silica with alumina, is disclosed in JP-B-47-26959. The method comprises gradually adding a silica sol having particles sizes of from 2 to 150 nm to an aqueous solution of polyaluminum chloride, aging the mixture until the pH becomes constant, i.e. usually it becomes 4 or less, and then adding an alkali to increase the pH of the mixture to a level of from 4.5 to 7.0. By this method, a silica sol having its surface coated with alumina, having excellent transparency and stability, can be obtained. However, since secondary aggregate particles are not formed, a xerogel obtainable by drying the silica sol has a small pore volume and pore radius, whereby the ink-receiving layer formed by employing the silica sol may have an inadequate ink absorptivity, in some cases.

An ink-receiving layer formed by using an alumina hydrate such as pseudo-boehmite, is excellent from the viewpoints of ink absorptivity, transparency, water resistance and glossiness, but has a problem in view of scuffing resistance. This is estimated to be because the alumina hydrate is not spherical. To overcome the problem, a method as disclosed in JP-A-7-76162, wherein a silica gel layer having a thickness of from 0.1 to 30 μm is provided on a porous layer made of pseudo-boehmite, is mentioned. However, this method has such a drawback that the silica gel layer inhibits the ink absorptivity, and is disadvantageous in view of industrial production because of the two-layer structure.

DISCLOSURE OF THE INVENTION

The present invention provides a silica-alumina composite sol which is a colloidal solution having aggregate particles containing silica and alumina dispersed in an aqueous medium, wherein the silica is such that the primary particles are spherical and the average particle size of the primary particles is from 2 to 200 nm, the average particle size of the aggregate particles is at least twice the average particle size of the silica primary particles and at most 1,000 nm, the ζ-potential of the aggregate particles is at least +10 mV, and the pH of the solution is from 3 to 9.

The present invention provides, as a preferred method for producing the above-mentioned silica-alumina composite sol, the following first production method and second production method.

The first production method is a method for producing a silica-alumina composite sol, which comprises gradually adding an aluminum salt of which the liquid exhibits acidity when dissolved in water, to a silica sol containing such silica particles that the primary particles are spherical and the average particle size of the primary particles is from 2 to 200 nm.

The second production method is a method for producing a silica-alumina composite sol, which comprises mixing a silica sol with an alumina sol having a specific surface area of a xerogel obtainable by drying of at least 150 m²/g, to form aggregate particles containing silica and alumina, and adjusting the aggregate particles to have an average particle size of from 30 to 1,000 nm, by peptization treatment.

The present invention further provides a recording medium having a porous layer formed by coating and drying on a substrate a silica-alumina composite sol which is a colloidal solution having aggregate particles containing silica and alumina dispersed in an aqueous medium, wherein the silica is such that the primary particles are spherical and the average particle size of the primary particles is from 2 to 200 nm, the average particle size of the aggregate particles is at least twice the average particle size of the silica primary particles and at most 1,000 nm, the ζ-potential of the aggregate particles is at least +10 mV, and the pH of the solution is from 3 to 9.

BEST MODE FOR CARRYING OUT THE INVENTION

The silica-alumina composite sol of the present invention comprises aggregate particles containing silica and alumina, as colloidal particles, dispersed in an aqueous medium.

The silica in the aggregate particles are such that the primary particles are spherical and the average particle size of the primary particles is from 2 to 200 nm.

The silica-alumina composite sol of the present invention has silica primary particles being spherical, whereby a high scuffing resistance can be obtained when the coating layer is formed on the substrate.

If the average particle size of the silica primary particles is smaller than 2 nm, when the composite sol is dried, a xerogel having a large average pore radius and pore volume can not obtainable, such being unfavorable. If the average particle size of the silica primary particles exceeds 200 nm, when the composite sol is dried, a xerogel having a large specific surface area can not be obtainable, and a xerogel having a high property for fixing dyes can not be obtainable, such being unfavorable. The more preferred range of the average particle size of the silica primary particles is from 5 to 100 nm. The average particle size of the silica primary particles is measured by a transmission electron microscope.

The average particle size of the aggregate particles is required to be at least twice the average particle size of the silica primary particles. A conventional silica sol is produced not to contain aggregate particles so that a good stability and dispersibility can be obtained. However, in the silica-alumina composite sol of the present invention, the aggregate particles are positively formed. Since the composite sol of the present invention contains such aggregate particles, the pore volume and the average pore radius of the xerogel can be made large, whereby an ink-receiving layer having an excellent ink absorptivity can be formed.

The average particle size of the aggregate particles is required to be at most 1,000 nm. If the average particle size of the aggregate particles exceeds 1,000 nm, when converted to the xerogel, not only the transparency decrease, and the haze of the ink-receiving layer increases, but also the color density of a cyan dye will decrease in the water resistance test as mentioned hereinafter. The average particle size of the aggregate particles is preferably at most 500 nm, since better transparency can be obtained. The average particle size of the aggregate particles is preferably at least 30 nm.

The silica-alumina composite sol of the present invention has a pH of from 3 to 9. If the pH is higher than 9, the ζ-potential of the aggregate particles will be low, such being unsuitable. On the contrary, if the pH is smaller than 3, alumina may dissolve, such being unsuitable. The more preferred range of the pH is from 3 to 7.

The silica-alumina composite sol of the present invention has a ζ-potential of the aggregate particles of at least +10 mV. The surface of a conventional silica sol is negatively charged, whereby it has no property for fixing anionic dyes to be used for an ink jet printer. For example, in the water resistance test as mentioned hereinafter, the color density of the cyan ink is substantially 0. On the contrary, the silica-alumina composite sol obtained in the present invention has a positive surface charge, whereby it has a property for fixing colorants, and the color density of the cyan ink is at least 1.0 in the water resistance test as mentioned hereinafter. The more preferred range of the ζ-potential of the aggregate particles is from +30 to +90 mV.

In the silica-alumina composite sol of the present invention, the ζ-potential of the aggregate particles tends to be high with increase in the amount of alumina relative to the silica. The alumina is required to be added so that the ζ-potential of the aggregate particles is at least +10 mV. The larger the specific surface area of the silica sol as the starting material, the more the alumina is required to be added, and the alumina is added preferably in an amount of at least 1 g as $Al_2O_3$ based on 100 g of the $SiO_2$ component in the silica sol. Although there will be no problem even if an excessive amount of the alumina is added, the operation to remove impurity ions by e.g. ultrafiltration as mentioned hereinafter may not easily be carried out, such being disadvantageous. The addition amount of the alumina relative to the silica is preferably at most 900 g as $Al_2O_3$ based on 100 g of the $SiO_2$ component in the silica sol. The more preferred range is from 5 to 400 g as $Al_2O_3$ based on 100 g of the $SiO_2$ component in the silica sol.

In the composite sol of the present invention, the amount of impurities (elements except Si, Al, O and H) is preferably at most 10 mol % relative to the total amount of number of atoms of Si and Al, based on the number of atoms. In a case where an ink-receiving layer is formed by using a silica-alumina composite sol having a larger amount of impurity elements than this range, after formation of the image, the color of the dyes may change, or the surface of the ink-receiving layer will have defects in appearance in the form of pits in the water resistance test as mentioned hereinafter, such being unfavorable.

By removing the solvent from the silica-alumina composite sol of the present invention, a xerogel having a specific surface area of at least 50 $m^2/g$, an average pore radius of at least 5 nm and a total pore volume having pore radii of from 1 to 100 nm of at least 0.35 $cm^2/g$, can be obtained. The average pore radius is more preferably at least 10 nm. Further, the total pore volume having pore radii of from 1 to 100 nm is more preferably at least 0.50 $cm^2/g$. These pore characteristics are measured by nitrogen adsorption/desorption method. Here, the average pore radius is represented by the value obtained by calculation from $2V/A \times 10^3$ (nm), where V ($cm^3/g$) is the total pore volume having pore radii of from 1 to 100 nm, and A ($m^2/g$) is the specific surface area.

Of the xerogel obtainable by removing the solvent from the composite sol, in a case where the average pore radius is less than 5 nm, in a case where the total pore volume having pore radii of from 1 to 100 nm is less than 0.35 $cm^2/g$, or in a case where the specific surface area is less than 50 $m^2/g$, respectively, the ink absorptivity may be inadequate when the ink-receiving layer is formed, such being unfavorable. The more preferred pore characteristics of the xerogel obtainable by removing the solvent from the composite sol are such that the specific surface area is at least 100 $m^2/g$, the average pore radius is at least 5.5 nm, and the total pore volume having pore radii of from 1 to 100 nm is at least 0.4 $cm^2/g$. In the present specification, simply the pore volume is meant to be the total pore volume having pore radii of from 1 to 100 nm.

When the silica-alumina composite sol of the present invention is dried to remove the solvent, a xerogel having a good transparency can be obtained. The xerogel presents an excellent property for fixing dyes, transparency and glossiness, when used for the ink-receiving layer of the recording medium for an ink jet printer.

The property for fixing dyes, transparency and glossiness of the ink-receiving layer can be evaluated as follows. The silica-alumina composite sol is mixed with a polyvinyl alcohol in an amount of 1 part by weight per parts by weight of the solid content of the silica-alumina composite sol, followed by concentration or dilution as the case requires, to prepare a coating fluid having a total solid content concentration of 10 wt %. This coating fluid is coated on a white polyethylene terephthalate film (opaque film having a white pigment dispersed in the inside) so that the coating amount after drying is from 4.5 to 5.5 g/m$^2$, followed by drying, to form a porous ink-receiving layer. Here, in a case of evaluating the transparency, a transparent polyethylene terephthalate film is employed as the substrate.

The water resistance (property for fixing dyes) of the ink-receiving layer is measured in such a manner that a film having a coating layer formed thereon is cut into an appropriate size, and soaked in a cyan ink (e.g. a color ink cartridge MJIC2C for an ink jet printer MJ-5000C manufactured by Seiko Epson Co., Ltd.) for 2 minutes, followed by washing with running water for 2 minutes to remove unfixed ink, and the color density of the ink-receiving layer by fixed cyan ink is measured by using a reflective color densitometer (RD-918, tradename, manufactured by Macbeth). To measure the reflected color density, a white reflection standard plate is put on the back side of the sheet for measurement. In this measurement, the color density of the ink-receiving layer is preferably at least 1, and in this case, the ink-receiving layer has an adequate water resistance.

The ink-receiving layer has a haze value of preferably at most 10%. The haze value of the ink-receiving layer is represented by the difference in the haze value between the polyethylene terephthalate film having the ink-receiving layer formed thereon and an uncoated polyethylene terephthalate film.

The glossiness of the ink-receiving layer is evaluated based on 600 specular glossiness as defined in JIS Z8741. The specular glossiness of the ink-receiving layer is preferably at least 20%.

Now, the first production method of the silica-alumina composite sol of the present invention will be explained more specifically. In the first production method, an aluminum salt of which the liquid exhibits acidity when dissolved in water, is added to a silica sol containing such silica particles that the primary particles are spherical and have an average particle size of from 2 to 200 nm.

The pH and the solvent of the silica sol as a starting material are not particularly limited, and the solvent is preferably water in view of easiness in the operation. For example, a commercially available silica sol such as Cataloid SI-40, tradename, manufactured by Catalysts & Chemicals Industries Co., Ltd., or Silicadol 20GA, tradename, manufactured by Nippon Chemical Industrial Co., Ltd., is preferably used. Further, the silica sol may optionally be diluted with water.

As the aluminum salt of which the liquid exhibits acidity when dissolved in water, preferred is a salt of aluminum hydroxide and a strong acid. In the present specification, the aluminum salt of which the liquid exhibits acidity when dissolved in water, will be referred to simply as an acid aluminum salt.

As the acid aluminum salt, an inorganic acid salt such as aluminum chloride, aluminum sulfate or aluminum nitrate, or an organic acid salt such as aluminum acetate, is preferably used. It is preferred that the acid aluminum salt is optionally dissolved in water, and mixed with the silica sol.

As the acid aluminum salt, particularly preferred is a polyaluminum chloride. The polyaluminum chloride is a compound having a chemical formula represented by $[Al_2(OH)_nCl_{6-n}]_m$ ($1<n<6$, $m<10$). For example, a commercially available one such as Takibine #1500 or PAC250A, tradenames, manufactured by Taki Chemical Co., Ltd., may be mentioned. The polyaluminum chloride has a basicity of preferably at least 20%. If the basicity is less than 20%, the content of Cl is high relative to Al, such being disadvantageous in the case of removing impurity elements by e.g. ultrafiltration as mentioned hereinafter. The basicity is represented by (n/6) in the above-mentioned formula by percentage, and the specific method of measurement is defined by JIS K1475.

The method for mixing the silica sol and the acid aluminum salt is not particularly limited, and preferred is a method of adding the acid aluminum salt to the silica sol. It is preferred that a predetermined amount of the acid aluminum salt is gradually added to the silica sol as the starting material. When the acid aluminum salt is gradually added to the silica sol, alumina gradually forms and adheres to the surface of the silica particles in the sol. With the increase in the amount of adhered alumina, the surface potential of the sol particles shifts from negative to positive. During this shift, the surface goes through the state of the potential being 0, whereby aggregation of the particles takes place, and the aggregate particles containing silica and alumina are formed. It is preferred to stir the silica sol when the acid aluminum salt is added, to prevent the concentration of the acid aluminum salt being locally high.

On the other hand, if the silica sol as the starting material is gradually added to a solution of the acid aluminum salt, although a sol containing composite particles having alumina adhered to the surface of the silica sol particles is formed, the aggregate particles are less likely to form. Accordingly, a xerogel obtainable by drying the sol may be one having a small pore volume and average pore radius.

The temperature at the time of mixing the silica sol and the acid aluminum salt is preferably from 25 to 150° C. If the temperature is lower than 25° C., the reaction rate tends to be low, and alumina may not adequately adhere to the surface of the silica particles, such being unfavorable. A temperature higher than 150° C. is unfavorable since the operation tends to be difficult.

As the addition amount of the acid aluminum salt, an amount enough to obtain a ζ-potential of the particles of at least +10 mV, is required. The larger the specific surface area of the sol particles of the silica sol as the starting material, the more the acid aluminum salt is required to be added. In the present specification, in the case of the silica sol to be used as the starting material having an average particle size of the primary particles of from 2 to 200 nm, it is preferred to add the acid aluminum salt in an amount of at least 1 g as calculated as $Al_2O_3$, based on 100 g of the silica as calculated as $SiO_2$. Although there will be no problem even if an excessive amount of the acid aluminum salt is added, the operation to remove impurity elements by e.g. ultrafiltration as mentioned hereinafter may not easily be carried out, such being disadvantageous.

In the first production method, it is referred to age a solution obtained by mixing the acid aluminum salt with the silica sol, at a pH of from 7 to 10 for aggregation, followed by peptization treatment, since a xerogel having a large pore volume can be obtained. In this case, by removing the solvent from the silica-alumina composite sol, a xerogel having a specific surface area of at least 50 m²/g, an average pore radius of at least 10 nm and a total pore volume having a pore radii of from 1 to 100 nm of at least 0.50 cm²/g, can be obtained.

The pH for the aggregation treatment is preferably from pH7 to 10. If the pH is lower than 7, no adequate aggregation may take place, and the pore radius, the total pore volume and the specific surface area can not be made large, such being unsuitable. On the other hand, if the pH is higher than 10, the color density of the ink in the water resistance test may decrease, such being unsuitable. The more preferred range of the pH is from pH7 to 9.

As the method to adjust the pH for the aggregation treatment to be from 7 to 10, a method of adding an alkali metal hydroxide or an alkali metal aluminate to a mixed solution of the silica sol and the acid aluminum salt, may be mentioned.

The aging is preferably carried out with stirring at a temperature of from 50 to 150° C. for at least 1 hour. If the temperature for aging is lower than 50° C., no adequate aggregation may take place, and the pore radius, the total pore volume and the specific surface area can not be made large, such being unsuitable. On the other hand, if the temperature is higher than 150° C., the operation tends to be difficult, such being unfavorable. The longer the aging time, the more adequately the aggregation proceeds, and the larger the pore radius, the total pore volume and the specific surface area can be made, and an ink-receiving layer employing such composite sol will have an excellent ink absorptivity. However, if the aging time is too long, transparency will decrease, and accordingly adjustment is required in moderation.

In a case where the solution after the aggregation treatment contains a large amount of impurity ions such as alkali metal ions, it is preferred to remove the impurity ions for purification, prior to the successive peptization treatment. As the method for removing the impurity ions, it is preferred to use an ultrafiltration membrane, since the efficiency is high.

The above-mentioned aggregation treatment is effective also when applied to a mixture obtained by gradually adding the silica sol to a solution of the aluminum salt of which the liquid exhibits acidity when dissolved in water. Namely, it is possible to produce a silica-alumina composite sol with which a xerogel having a large pore volume and a large pore radius can be obtainable, by aging a mixture obtained by gradually adding the silica sol to a solution of the aluminum salt of which the liquid exhibits acidity when dissolved in water, at a pH of from 7 to 10 for aggregation treatment, followed by peptization treatment.

In the first production method, the aggregate particles can be formed more effectively by adding an electrolyte other than the acid aluminum salt to the silica sol. Here, the electrolyte to be added is not particularly limited so long as it has an aggregation effect to the silica sol or the alumina sol, and sodium chloride, calcium chloride, sodium sulfate, potassium acetate or magnesium nitrate may, for example, be mentioned. They may be used alone or in combination as a mixture. The addition amount is preferably from 1 to 70 wt % based on the weight of the silica (calculated as $SiO_2$) in the silica sol as the starting material.

The method of adding the electrolyte is not particularly limited, and such an electrolyte may preliminarily be added to the silica sol, or it may be added to the acid aluminum salt followed by addition to the silica sol. Otherwise, the electrolyte may be added to a mixed solution having the acid aluminum salt added to the silica sol.

Then, it is preferred to remove the impurity ions such as unreacted acid aluminum salt or the added electrolyte, from the mixed solution having the acid aluminum salt added to the silica sol. As the method of removal, ultrafiltration is preferred.

Now, the second production method of the silica-alumina composite sol of the present invention will be explained more specifically. The second production method is a method for producing a silica-alumina composite sol, which comprises mixing the silica sol and the alumina sol having a specific surface area of a xerogel obtainable by drying of at least 150 m²/g, to form the aggregate particles containing silica and alumina, and adjusting the aggregate particles to have an average particle size of from 30 to 1,000 nm, by peptization treatment.

Specifically, it is preferred to employ the following method. Namely, a silica sol having an average particle size of the primary particles of from 10 to 200 nm and an alumina sol are mixed and reacted. Aggregation will take place by mixing. Then, the composite sol is adjusted to have particle sizes of the aggregate particles of from 30 to 1,000 nm, by peptization treatment.

The silica sol to be used in the present invention is preferably one having spherical particles as primary particles having an average particle size of from 10 to 200 nm. By using the spherical particles, the composite sol with the alumina sol will have the scuffing resistance. If the average particle size of the primary particles is at most 10 nm, the primary particles are too small, whereby a composite sol having a large pore radius and pore volume may not be obtained. Further, if it exceeds 200 nm, the specific surface area tends to be small, and one having a high color density of the cyan dye in the water resistance test may not be obtained.

The alumina sol to be used in the present invention is a sol comprising alumina hydrate as the sol particles, and when the alumina sol alone is dried to obtain a xerogel, the xerogel has a specific surface area of preferably at least 150 m²/g, more preferably at least 230 m²/g. As the alumina hydrate, boehmite ($Al_2O_3 \cdot nH_2O$, n is from 1 to 1.5) is preferred. In the present invention, the specific surface area of the xerogel obtainable by drying the composite sol, is made large, by using such an alumina sol capable of forming a xerogel having a large specific surface area. As the specific surface area is large, the adsorption sites for dyes can be increased when the composite sol is dried, and an ink-receiving layer having a high color density of the cyan dye in the water resistance test can be formed.

As the silica sol as the starting material, spherical particles having primary particle sizes of from 10 to 200 nm are preferred, and a commercially available silica sol such as Cataloid SI-45P, tradename, manufactured by Catalysts & Chemicals Industries Co., Ltd. or Silicadol 20GA, tradename, manufactured by Nippon Chemical Industrial Co., Ltd. may be preferably used. The pH, the solvent, etc. are not particularly limited. However, the solvent is preferably water in view of easiness in operation. Further, it may optionally be diluted with water.

The alumina sol as the starting material is a sol comprising an alumina hydrate as the sol particles. The production method is not particularly limited, and it can be obtained by a method of optionally aging an alumina gel obtained by hydrolysis of an aluminum alkoxide or by neutralization or ion exchange of an alkali metal aluminate or an aluminum salt, followed by washing and peptization.

Here, with respect to the alumina sol, the larger the specific surface area of the xerogel obtainable by drying the sol, the larger the specific surface area of the xerogel obtainable by drying the silica-alumina composite sol, and an ink-receiving layer having a high color density of the cyan dye in the water resistance test can be formed, such being favorable. The specific surface area of the xerogel obtainable by drying the alumina sol is preferably at least 150 $m^2$/g, more preferably at least 230 $m^2$/g. Alumina hydrate particles having such a high specific surface area, can be obtained, by controlling the conditions for aging the above-mentioned alumina gel obtained by hydrolysis of an aluminum alkoxide or by neutralization or ion exchange of an alkali metal aluminate or an aluminum salt, i.e. the pH, the temperature and the time.

It is preferred that the alumina gel obtained as mentioned above is optionally washed followed by peptization to obtain an alumina sol. The method of peptization is not particularly limited, and a method of adding an acid such as hydrochloric acid, nitric acid, acetic acid or amidosulfuric acid as a peptizer, or a method of peptization by mechanical means such as ultrasonic dispersion, may be mentioned. Further, they may be used together. The smaller the average particle size of the sol particles, the more uniform silica alumina composite sol can be obtained, and accordingly, the average particle size of the sol particles is preferably at most 500 nm. The average particle size of the sol particles is more preferably at most 300 nm.

In the second production method, the method of mixing the silica sol and the alumina sol is not particularly limited. The alumina sol may be added to the silica sol with stirring, or the silica sol may be added to the alumina sol with stirring. The temperature at the time of mixing is not particularly limited, and the mixing may be carried out under ordinary temperature or under optionally heating. However, if the temperature is too high, the operation tends to be difficult, and accordingly it is preferably at most 150° C.

The addition amount of the alumina sol to the silica sol is preferably such that the alumina solid content is from 10 to 400 g based on 100 g of the silica solid content (calculated as $SiO_2$). The larger the addition amount of the alumina sol, the higher the $\zeta$-potential of the composite sol tends to be high. As the addition amount of the alumina sol, it is preferred to add the alumina sol in an amount enough to obtain positively charged aggregate particles. In the case of using a silica sol having primary particle sizes of from 10 to 200 nm, it is necessary to add the alumina sol in an amount of at least 10 g as the alumina solid content based on 100 g of the silica solid content (calculated as $SiO_2$). On the other hand, if the addition amount of the alumina sol is too large, when an ink-receiving layer is formed by using the obtained silica-alumina composite sol, the scuffing resistance of the ink-receiving layer may decrease, such being unfavorable.

In the present invention, the mixture of the above-mentioned silica sol and alumina sol is adjusted to have aggregate particle sizes of from 30 to 1,000 nm by peptization treatment. The method of peptization treatment is not particularly limited, and a method of adding a peptizer or a mechanical method such as ultrasonic dispersion may be mentioned. Further, they may be used together. As the peptizer, e.g. hydrochloric acid, nitric acid, sulfuric acid, acetic acid or amidosulfuric acid may be preferably used. They may be used alone or in combination as a mixture.

With respect to the silica-alumina composite sol synthesized by the first production method or the second production method, it may be directly used in the case where the average particle size of the aggregate particles is at most 1,000 nm, or as the case requires, the average particle size of the aggregate particles may be adjusted. The average particle size of the aggregate particles can be made small by e.g. ultrasonic dispersion. Further, peptization may be carried out by e.g. adding a peptizer. The peptizer is not particularly limited, and an inorganic acid such as hydrochloric acid, nitric acid, sulfuric acid or amidosulfuric acid, or an organic acid such as acetic acid, may be preferably used. Such a peptizer may be used alone or in combination as a mixture.

When the silica-alumina composite sol of the present invention is dried to remove the solvent, a xerogel having a high transparency and a high absorptivity can be obtained. Accordingly, by coating and drying on a substrate a coating fluid obtained by mixing the silica-alumina composite sol of the present invention with an optional binder, a recording medium having an ink-receiving layer which is excellent in ink absorptivity, transparency, water resistance, scuffing resistance and glossiness, can be obtained. The silica-alumina composite sol of the present invention may be filled in the paper substrate.

In the case of forming the ink-receiving layer from the silica-alumina composite sol, the binder is not particularly limited, and starch or its modified product, a polyvinyl alcohol or its modified product, a cellulose derivative such as carboxymethyl cellulose, SBR latex, NBR latex or polyvinyl pyrolidone may, for example, be mentioned.

The substrate for the ink-receiving layer is not particularly limited, and a film of a resin such as polyethylene terephthalate, a paper sheet such as woodfree paper or synthetic paper, a cloth, glass, a metal, leather, wood or ceramic such as pottery may, for example, be mentioned. Further, it may be formed on the top or the bottom of an ink-receiving layer formed by containing e.g. boehmite, a silica gel or a cationic resin other than one of the present invention.

EXAMPLES

Example 1

To a glass reactor having a capacity of 2,000 $cm^3$, 198.0 g of a silica sol with spherical silica primary particles with an average particle size of the primary particles of 17 nm dispersed therein ($SiO_2$ concentration: 40.4 wt %, $Na_2O$ concentration: 0.41 wt %, Cataloid SI-40, tradename, manufactured by Catalysts & Chemicals Industries Co., Ltd.) and 1,402 g of ion-exchanged water were put, and the temperature was raised to 80° C. When the temperature reached 80° C., 85.9 g of an aqueous polyaluminum chloride solution (aluminum concentration: 23.6 wt % as calculated as $Al_2O_3$, Cl concentration: 8.1 wt %, basicity: 84%, Takibine #1500, tradename, manufactured by Taki Chemical Co., Ltd.) was gradually added thereto with stirring over a period of about 10 minutes.

After the completion of the addition, the temperature was kept to be 80° C. with stirring further for 1 hour. Then, the reaction fluid was subjected to ultrafiltration by using an ultrafiltration apparatus, while keeping the amount of the fluid constant by adding ion-exchanged water, until the electrical conductivity of the filtrate decreased to at most 50 $\mu$S/cm, for purification, and a silica-alumina composite sol was obtained.

The amount of impurity elements contained in the composite sol was 2.9 mol % in total of 0.7 mol % of Na and 2.2 mol % of Cl, based on the total number of moles of Si and Al. With respect to this sol, various evaluations were carried out by methods as mentioned hereinafter (the same applies to other Examples). In this sol, aggregate particles aggregated to have an average particle size of 129 nm, and the aggregate particles were positively charged. The xerogel obtained by drying the sol, has a large pore volume and a large average pore radius. As the characteristics of the ink-receiving layer, the color density of a cyan ink was high, and performances were excellent in all views of transparency, glossiness and scuffing resistance.

Example 2

The same operation as in Example 1 was carried out except that 1,402 g of an aqueous solution containing 24.0 g of sodium chloride, instead of 1,402 g of ion-exchanged water, was added to the silica sol, to carry out the reaction and purification, and a silica-alumina composite sol was obtained.

The amount of impurity elements contained in this composite sol was 6.5 mol % in total of 2.0 mol % of Na and 4.5 mol % of Cl based on the total number of moles of Si and Al. Then, this sol was subjected to ultrasonic treatment, to adjust the average particle size of the aggregate particles to be 217 nm. The ink-receiving layer formed by using this sol was excellent in water resistance, had a high color density of a cyan ink and had excellent performances in all views of transparency, glossiness and scuffing resistance, in the same manner as in Example 1.

Example 3 (Comparative Example)

Characteristics of the silica sol itself used as the starting material in Example 1 were evaluated. The pore volume and the average pore radius of the xerogel were smaller than the sol obtained in Example 1. Further, an ink-receiving layer was formed by using this silica sol, and the characteristics were evaluated, whereupon the color density of a cyan ink in the water resistance test was 0, and no property for fixing dyes was obtained.

Example 4

A sol was obtained in the same manner as in Example 1 except that no purification by ultrafiltration was carried out. The amount of impurity elements contained in this sol was 12.8 mol % in total of 1.5 mol % of Na and 11.3 mol % of Cl based on the total number of moles of Si and Al, and a large amount of Cl was contained.

An ink-receiving layer was formed by using this sol, and the characteristics were evaluated. From the color density of a cyan ink in the water resistance test, it was found that the property for fixing dyes was obtained. However, as compared with the sol in Example 1, characteristics were poor in the color density of a cyan ink and haze. Further, in the water resistance test, part of the surface of the ink-receiving layer had defects in appearance, and further, it was observed that part of the ink-receiving layer peeled off from the substrate polyethylene terephthalate film.

Example 5 (Comparative Example)

To a glass reactor having a capacity of 2,000 $cm^3$, 85.9 g of the aqueous polyaluminum chloride solution (Takibine #1500, tradename, manufactured by Taki Chemical Co., Ltd.) as used in Example 1 and 1,402 g of ion-exchanged water were put, with an addition method different from Example 1, and the temperature was raised to 80° C. When the temperature reached 80° C., 198.0 g of the silica sol (Cataloid SI-40, tradename, manufactured by Catalysts & Chemicals Industries Co., Ltd.) as used in Example 1 as the starting material was gradually added thereto with stirring over a period of about 10 minutes. After the completion of the addition, the temperature was kept to be 80° C. with stirring for 1 hour. The reaction fluid was purified in the same manner as in Example 1, to obtain a silica-alumina composite sol.

The amount of impurity elements contained in this sol was 2.9 mol % in total of 0.6 mol % of Na and 2.3 mol % of Cl, based on the total number of moles of Si and Al. However, in this sol, the average particle size of the aggregate particles was 27 nm, and the aggregate particles were not adequately formed, whereby the pore volume and the average pore radius were small. Further, when an ink-receiving layer was formed by using this sol, the color density of a cyan ink in the water resistance test, the haze and the glossiness were inferior to Examples 1 and 2.

Measurement for Physical Properties of the Sol

The physical properties of the sols in Examples 1 to 5 were measured as follows. With respect to the sol concentration, the sol was dried at 140° C. until the constant weight, and it was obtained from the difference in weight before and after the drying. The pH was studied by using a pH meter HM-12P manufactured by Toa Electronics, Ltd. The $\zeta$-potential was studied by using an electrophoretic light-scattering photometer ELS-800 manufactured by Otsuka Electronics. The average particle size of the aggregate particles was studied by using microtrack UPA manufactured by NIKKISO CO., LTD.

TABLE 1

| Example | Sol concentration (wt %) | pH | $\zeta$-potential (mV) | Average particle size of aggregate particles (nm) |
|---|---|---|---|---|
| 1 | 7.1 | 4.8 | +45 | 129 |
| 2 | 6.7 | 5.0 | +43 | 217 |
| 3 | 40.8 | 8.9 | −37 | No aggregation |
| 4 | 7.1 | 4.1 | +43 | 404 |
| 5 | 6.5 | 5.0 | +39 | 27 |

Measurement for Physical Properties of the Xerogel

Each of the sols in Examples 1 to 5 was dried at 140° C. until the constant weight, to obtain a powder of a xerogel. The powder was deaerated under vacuum at a temperature of 120° C. under $1\times10^{-2}$ Torr for 2 hours, and then the specific surface area, the pore volume and the average pore radius were measured by using a nitrogen adsorption/desorption apparatus (OMNISORP Model 100, tradename, manufactured by COULTER). The average pore radius was represented by the value calculated from $2V/A\times10^3$. The results are shown in Table 2.

TABLE 2

| Example | Specific surface area (m²/g) | Pore volume (cm³/g) | Average pore radius (nm) |
|---------|------------------------------|---------------------|--------------------------|
| 1 | 163 | 0.45 | 5.5 |
| 2 | 158 | 0.46 | 5.8 |
| 3 | 174 | 0.25 | 2.9 |
| 4 | 30  | 0.10 | 6.7 |
| 5 | 137 | 0.33 | 4.8 |

TABLE 3

| Example | Cyan color density | Haze (%) | Glossiness (%) | Scuffing resistance |
|---------|--------------------|----------|----------------|---------------------|
| 1 | 1.62 | 1.0  | 49 | ○ |
| 2 | 1.78 | 2.7  | 47 | ○ |
| 3 | 0.00 | 0.7  | 47 | ○ |
| 4 | 0.59 | 7.1  | 55 | ○ |
| 5 | 0.95 | 17.2 | 38 | ○ |

Evaluation for Characteristics of the Ink-receiving Layer

With each of the sols obtained in Examples 1 to 5, an aqueous polyvinyl alcohol solution (R1130, tradename, manufactured by KURARAY CO., LTD.) was mixed in such a ratio that the solid concentration ratio was 100:10, to obtain a coating fluid having a total solid content concentration of 10 wt %, which was then coated on a white polyethylene terephthalate film (U2, tradename, manufactured by TEIJIN LTD.) having a thickness of 100 μm by a bar coater, followed by drying at 70° C. for 15 minutes, to form an ink-receiving layer. The characteristics of the ink-receiving layer were studied as follows. Here, with respect to the haze, measurement was carried out by using one having an ink-receiving layer formed in the same manner as mentioned above on a polyethylene terephthalate film (OL, tradename, manufactured by TEIJIN LTD.) having a thickness of 125 μm.

Coating amount: The film after coating was cut into a 10 cm square, the ink-receiving layer was peeled off from the polyethylene terephthalate film, and the coating amount was studied from the difference in weight. The coating amount was 5.0 g/m² in all Examples 1 to 5.

Cyan color density: A cyan color density was measured by the following method, for water resistance test. The polyethylene terephthalate film having the ink-receiving layer formed thereon was cut into 3 cm×5 cm, soaked in a cyan ink for 2 minutes, and washed with running water for 2 minutes to remove unfixed ink, followed by drying at 70° C. for 15 minutes. Then, the color density of fixed cyan ink was measured by using a reflective color densitometer RD-918, manufactured by Macbeth. As the cyan ink, cyan ink taken out from color ink cartridge MJIC2C for a color printer MJ-5000C manufactured by Seiko Epson Co., Ltd., was used.

Haze: Measurement was carried out by using a haze computer HGM-3DP manufactured by Suga Shikenkisha, and the haze value of 0.7 of the polyethylene terephthalate film as the substrate was subtracted, to obtain the haze of the coated layer.

Glossiness: 60° specular glossiness was measured by using a handy glossmeter PG-1 manufactured by Nihon Denshoku Kogyo.

Scuffing resistance: By a method as disclosed in JP-A-7-76162, i.e. by using a friction testing apparatus manufactured by Suga Shikenkisha, a cotton gauze was pressed against the surface of the ink-receiving layer with a load of 200 g to carry out 100 times friction test, and then the surface was visually observed, whereupon the case where there was no fracture was judged to be good in the scuffing resistance, and rated as ○, case where fractures were formed was rated as X.

Example 6

To a glass reactor having a capacity of 2,000 cm³, 165.3 g of a silica sol having spherical silica primary particles having an average particle size of the primary particles of 26 nm dispersed therein ($SiO_2$ concentration: 48.4 wt %, $Na_2O$ concentration: 0.51 wt %, Cataloid SI-50, tradename, manufactured by Catalysts & Chemicals Industries Co., Ltd.) and 1,457 g of ion-exchanged water were put, and the temperature was raised to 80° C. When the temperature reached 80° C., 63.8 g of an aqueous polyaluminum chloride solution (aluminum concentration: 23.6 wt % as calculated as $Al_2O_3$, Cl concentration: 8.1 wt %, basicity: 84%, Takibine #1500, tradename, manufactured by Taki Chemical Co., Ltd.) was gradually added thereto with stirring over a period of about 10 minutes. After the completion of the addition, the temperature was kept to be 80° C. with stirring further for 1 hour, to obtain a solution having a silica sol and an acid aluminum salt mixed.

Then, the temperature of the mixed solution was raised to 95° C., and when it reached to 95° C., 11.0 g of a 48% NaOH solution was added thereto to adjust the pH 8.0, and then the temperature was kept to be 95° C. with stirring for 24 hours for aging, to carry out aggregation treatment.

Then, prior to peptization treatment, the reaction fluid after the aggregation treatment was subjected to ultrafiltration by using an ultrafiltration apparatus, while keeping the amount of the fluid constant by adding ion-exchanged water, until the electrical conductivity of the filtrate decreased to at most 50 μS/cm, for purification.

Then, an amidosulfuric acid solution having a concentration of 10% was added to the purified solution, to adjust the pH 4.5, and peptization treatment was carried out by using an ultrasonic disperser to obtain a silica-alumina composite sol.

With respect to this sol, various evaluations were carried out by the method as mentioned hereinafter (the same applies to other Examples). In this sol, the aggregate particles aggregated to have an average particle size of 233 nm, and the aggregate particles were positively charged. The xerogel obtained by drying the sol had a large pore volume and a large average pore radius as compared with the following sol of Example 9 having no aggregation treatment applied thereto. As the characteristics of the ink-receiving layer, the color density of a cyan ink was high, and performances were excellent in all views of transparency, glossiness and scuffing resistance.

Example 7

To a glass reactor having a capacity of 2,000 cm³, 57.1 g of a silica sol having spherical silica primary particles having an average particle size of the primary particles of 26 nm dispersed therein ($SiO_2$ concentration: 48.4 wt %, $Na_2O$ concentration: 0.51 wt %, Cataloid SI-50, tradename, manufactured by Catalysts & Chemicals Industries Co., Ltd.) and 1,825 g of ion-exchanged water were put, and the temperature was raised to 80° C. When the temperature reached 80° C., 118.3 g of an aqueous aluminum chloride solution (aluminum concentration: 11.5 wt % as calculated as $Al_2O_3$) was gradually added thereto with stirring over a period of about 10 minutes. After the completion of the addition, the temperature was kept to be 80° C. with stirring further for 1 hour, to obtain a solution having a silica sol and an acid aluminum salt mixed.

Then, the temperature of the mixed solution was raised to 95° C., and when it reached to 95° C., 66.0 g of a 48% NaOH solution was added thereto to adjust the pH 8.0, and then the temperature was kept to be 95° C. with stirring for 24 hours for aging, to carry out aggregation treatment.

Then, purification and peptization were carried out in the same manner as in Example 6, to obtain a silica-alumina composite sol having an average particle size of the aggregate particles of 216 nm. The xerogel obtained by drying the sol had an extremely large pore volume and a large average pore radius, as compared with the following sol of Example 10 having no aggregation treatment applied thereto. Further, the color density of a cyan ink was high.

Example 8

To a glass reactor having a capacity of 2,000 $cm^3$, 198.0 g of a silica sol having spherical silica primary particles having an average particle size of the primary particles of 80 nm dispersed therein ($SiO_2$ concentration: 40.4 wt %, $Na_2O$ concentration: 0.38 wt %, Cataloid SI-80P, tradename, manufactured by Catalysts & Chemicals Industries Co., Ltd.) and 1,425 g of ion-exchanged water were put, and the temperature was raised to 80° C. When the temperature reached 80° C., 63.0 g of an aqueous polyaluminum chloride solution (aluminum concentration: 23.6 wt % as calculated as $Al_2O_3$, Cl concentration: 8.1 wt %, basicity: 84%, Takibine #1500, tradename, manufactured by Taki Chemical Co., Ltd.) was gradually added thereto with stirring over a period of about 10 minutes. After the completion of the addition, the temperature was kept to be 80° C. with stirring further for 1 hour, to obtain a solution having a silica sol and an acid aluminum salt mixed.

Then, the temperature of the mixed solution was raised to 95° C., and when it reached to 95° C., 13.6 g of a 48% NaOH solution was added thereto to adjust the pH 9.0, and then the temperature was kept to be 95° C. with stirring for 24 hours for aging, to carry out aggregation treatment.

Then, purification and peptization were carried out in the same manner as in Example 6, to obtain a silica-alumina composite sol having an average particle size of the aggregate particles of 175 nm. The xerogel obtained by drying the sol had a large pore volume and an extremely large average pore radius, as compared with the following sol of Example 11 having no aggregation treatment applied thereto.

Example 9

A silica-alumina composite sol having an average particle size of the aggregate particles of 212 nm was obtained in the same manner as in Example 6 except that no aggregation treatment of Example 6 was carried out.

Example 10

A silica-alumina composite sol having an average particle size of the aggregate particles of 213 nm was obtained in the same manner as in Example 7 except that no aggregation treatment of Example 7 was carried out.

Example 11

A silica-alumina composite sol having an average particle size of the aggregate particles of 180 nm was obtained in the same manner as in Example 8 except that no aggregation treatment of Example 8 was carried out.

Measurement for Physical Properties of the Sol

The physical properties of the sols in Examples 6 to 11 were measured in the same manner as in Example 1, and the results are shown in Table 4.

TABLE 4

| Example | Sol concentration (wt %) | pH | $\zeta$-potential (mV) | Average particle size of aggregate particles (nm) |
| --- | --- | --- | --- | --- |
| 6 | 11.7 | 4.5 | +47 | 233 |
| 7 | 15.4 | 4.5 | +54 | 216 |
| 8 | 14.8 | 4.5 | +48 | 175 |
| 9 | 10.5 | 4.5 | +45 | 212 |
| 10 | 14.2 | 4.5 | +56 | 213 |
| 11 | 13.6 | 4.5 | +42 | 180 |

Measurement for Physical Properties of the Xerogel

Each of the sols in Examples 6 to 11 was dried at a temperature of 140° C. until the constant weight, to obtain a powder of a xerogel. With respect to the powder, the specific surface area, the pore volume and the average pore radius were measured in the same manner as in Example 1, and the results are shown in Table 5.

TABLE 5

| Example | Specific surface area $m^2/g$) | Pore volume ($cm^3/g$) | Average pore radius (nm) |
| --- | --- | --- | --- |
| 6 | 82 | 0.57 | 13.9 |
| 7 | 149 | 0.81 | 10.9 |
| 8 | 52 | 0.61 | 23.5 |
| 9 | 72 | 0.33 | 9.2 |
| 10 | 54 | 0.21 | 7.8 |
| 11 | 36 | 0.17 | 9.4 |

Evaluation for Characteristics of the Ink-receiving Layer

By using each of the sols obtained in Examples 6 to 11, an ink-receiving layer was formed on a polyethylene terepthalate film in the same manner as in Example 1. Similarly, the coating amount of the ink-receiving layer was studied, whereupon the coating amount was 5.0 g/m in all Examples 6 to 11. With respect to the ink-receiving layer, the cyan color density, the haze, the glossiness and the scuffing resistance were measured in the same manner as in Example 1, and the results are shown in Table 6.

TABLE 6

| Example | Cyan color density | Haze (%) | Glossiness (%) | Scuffing resistance |
| --- | --- | --- | --- | --- |
| 6 | 1.4 | 5 | 29 | ◯ |
| 7 | 1.2 | 12 | 8 | ◯ |
| 8 | 0.3 | 23 | 26 | ◯ |
| 9 | 1.3 | 8 | 33 | ◯ |
| 10 | 0.3 | 14 | 18 | ◯ |
| 11 | 0.3 | 47 | 7 | ◯ |

Example 12

Firstly, an alumina sol (sol comprising boehmite particles) was synthesized as follows. To a glass reactor having a capacity of 2,000 $cm^3$, 310 g of an aqueous aluminum chloride solution (aluminum concentration: 11.5 wt % as calculated as $Al_2O_3$, Cl concentration: 24.0 wt %) and 1,341 g of water were put, and 237 g of an aqueous sodium aluminate solution (aluminum concentration: 20.0 wt % as calculated as $Al_2O_3$, sodium concentration: 19.0 wt % as calculated as $Na_2O$) was added thereto with stirring over a period of 60 minutes. Then, the temperature of the reaction fluid was raised to 95° C., and 112 g of the same aqueous sodium aluminate solution as mentioned above was added thereto, to adjust the pH of the reaction fluid 9 (95° C.). The reaction fluid was stirred for 2 hours while keeping to be 95° C. for aging, to obtain an alumina hydrate.

From the alumina hydrate, NaCl produced as by-product was removed by an ultrafiltration method for purification, and 3.1 g of acetic acid was added thereto for peptization, followed by concentration to adjust the concentration 15.8 wt %. Further, ultrasonic dispersion was carried out to obtain an alumina sol having an aggregate particle size of 65 nm. The alumina sol had a pH of 4.5, and the xerogel obtained by directly drying the sol had a specific surface area of 279 $m^2/g$.

Then, to a glass reactor having a capacity of 2,000 $cm^3$, 49 g of a silica sol manufactured by Catalysts & Chemicals Industries Co., Ltd. ($SiO_2$ concentration 40.8 wt %, $Na_2O$ concentration: 0.44 wt %, primary particle size: 43 nm, Cataloid SI-45P, tradename) and 1,551 g of water were put, and the temperature was raised to 80° C. When the temperature reached 80° C., 181 g of the above alumina sol (concentration: 15.8 wt %) was gradually added thereto with stirring over a period of about 10 minutes. The addition amount of the alumina solid content (as calculated as boehmite) was 29 g based on 20 g of the silica sol as calculated as $SiO_2$. The temperature was kept to be 80° C. with stirring for 1 hour after the completion of the addition.

In the mixture of the silica sol and the alumina sol, aggregate particles aggregated to have a size of 333 nm. Acetic acid was added thereto to adjust the pH 4.2, followed by concentration to adjust the concentration 10.0 wt %. Then, peptization treatment was carried out by using an ultrasonic dispersing apparatus, to adjust the aggregate particle size 189 nm, to obtain a silica-alumina composite sol. The silica-alumina composite sol had a ζ-potential of +52 mV, i.e. was positively charged.

Example 13 (Comparative Example)

The silica sol manufactured by Catalysts & Chemicals Industries Co., Ltd. (Cataloid SI-45P, tradename) used in Example 12 as the starting material, was similarly evaluated for comparison.

Example 14 (Comparative Example)

The alumina sol used in Example 12 as the starting material was similarly evaluated for comparison.

Measurement for Physical Properties of the Sol

The physical properties of the sols in Examples 12 to 14 were measured in the same manner as in Example 1, and the results are shown in Table 7. The ζ-potential of the silica sol of Example 13 was negative, whereas the ζ-potential of the silica-alumina composite sol of Example 12 was positive, as same as the alumina sol of Example 14.

TABLE 7

| Example | Sol concentration (wt %) | pH | ζ-potential (mV) | Average particle size of aggregate particles (nm) |
|---|---|---|---|---|
| 12 | 10.0 | 4.2 | +52 | 189 |
| 13 | 41.2 | 10.2 | −37 | No aggregation |
| 14 | 15.8 | 4.5 | +65 | 65 |

Measurement for Physical Properties of the Xerogel

Each of the sols in Examples 12 to 14 was dried at a temperature of 140° C. until the constant weight, to obtain a powder of a xerogel. With respect to the powder, the specific surface area, the pore volume and the average pore radius were measured in the same manner as in Example 1, and the results are shown in Table 8. The silica-alumina composite sol of Example 12 had a larger pore volume and pore radius than the silica sol of Example 13 and the alumina sol of Example 14, and had an adequately large value of the specific surface area.

TABLE 8

| Example | Specific surface area $m^2/g$ | Pore volume ($cm^3/g$) | Average pore radius (nm) |
|---|---|---|---|
| 12 | 196 | 0.47 | 4.8 |
| 13 | 57 | 0.26 | 9.1 |
| 14 | 279 | 0.45 | 3.2 |

Evaluation for Characteristics of the Ink-receiving Layer

By using each of the sols obtained in Examples 12 to 14, an ink-receiving layer was formed on the same polyethylene terephthalate film as in Example 1. Similarly, the coating amount of the ink-receiving layer was studied, whereupon the coating amount was 5.0 $g/m^2$ in all Examples 12 to 14. With respect to the ink-receiving layer, the cyan color density, the haze, the glossiness and the scuffing resistance were measured in the same manner as in Example 1. The results are shown in Table 9.

The ink-receiving layer obtained from the silica-alumina composite sol of Example 12 had a high water resistance and had a scuffing resistance. On the other hand, the ink-receiving layer obtained from the silica sol of Example 13 had substantially no water resistance. Further, the ink-receiving layer obtained from the alumina sol of Example 14 had a relative water resistance, but had no scuffing resistance.

TABLE 9

| Example | Cyan color density | Haze (%) | Glossiness (%) | Scuffing resistance |
|---|---|---|---|---|
| 12 | 2.2 | 1.3 | 47 | ○ |
| 13 | 0.0 | 0.8 | 48 | ○ |
| 14 | 0.9 | 0.6 | 48 | x |

INDUSTRIAL APPLICABILITY

With respect to the silica-alumina composite sol of the present invention, a xerogel obtainable by removing the solvent had an ink absorptivity, and forms a porous layer having a property for fixing dyes.

By using the silica-alumina composite sol of the present invention, a porous layer which has an ink absorptivity and a property for fixing dyes can be formed. By mixing the sol with an optional binder to obtain a coating fluid, and coating it on a substrate followed by drying, an ink-receiving layer which is excellent in all views of ink absorptivity, transparency, water resistance, glossiness and scuffing resistance. The ink-receiving layer obtainable in such a manner is suitable for a recording medium for an ink jet printer.

What is claimed is:

1. A method for producing a silica-alumina composite sol which forms a colloidal solution having aggregate particles containing silica and alumina dispersed in an aqueous medium, and having an average particle size of the aggregate particles of at least twice the average particle size of the silica primary particles and at most 1,000 nm, and a ζ-potential of the aggregate particles of at least +10 mV, and the colloidal solution has a pH of from 3 to 9, which comprises gradually adding an aluminum salt of which the liquid exhibits acidity when dissolved in water, to a silica sol containing such silica particles that the primary particles are spherical and the average particle size of the primary particles is from 2 to 200 nm.

2. The method for producing a silica-alumina composite sol according to claim 1, which comprises adding to a silica sol an electrolyte other than the aluminum salt of which the liquid exhibits acidity when dissolved in water, in an amount of from 1 to 70 wt % based on the weight of the silica.

3. The method for producing a silica-alumina composite sol according to claim 2, which comprises aging a solution having a silica sol and an aluminum salt of which the liquid exhibits acidity when dissolved in water, mixed, at a pH of from 7 to 10 for aggregation treatment, followed by peptization treatment.

4. A silica-alumina composite sol which is a colloidal solution having aggregate particles containing silica and alumina dispersed in an aqueous medium, wherein the silica is such that primary particles thereof are spherical and have an average particle size of from 2 to 200 nm, an average particle size of the aggregate particles being at least twice the average particle size of the silica primary particles and at most 1,000 nm, and wherein the aggregate particles have a ζpotential of at least +10 millivolts, and the colloidal solution has a pH of from3 to 9.

5. The silica-alumina composite sol of claim 4, wherein a total amount of elements except Si, Al, O and H, is at most 10 mol % relative to a total amount of number of atoms of Si and Al, based on a total number of atoms.

6. The silica-alumina composite sol of claim 4, having a pH of from 3 to 7.

7. The silica-alumina composite sol of claim 4, having a ζ-potential of from +30 to 90 mV.

8. The silica-alumina composite of claim 4, wherein the aggregate particles have an average particle size of from 30 to 500 nm.

9. The silica-alumina composite of claim 8, wherein the aggregate particles have an average particle size of from 30 to less than 500 nm.

10. A xerogel obtained by removing solvent from a silica-alumina composite sol which is a colloidal solution having aggregate particles containing silica and alumina dispersed in an aqueous medium, wherein the silica is such that primary particles thereof are spherical and have an average particle size of from 2 to 200 nm, an average particle size of the aggregate particles being at least twice the average particle size of the silica primary particles and at most 1,000 nm, and wherein the aggregate particles have a ζ-potential of at least +10 millivolts, and the colloidal solution has a pH of from 3 to 9; said xerogel having a specific surface area of at least 50 $m^2/g$, an average pore radius of at least 5 nm, and at a total pore volume having pore radii of from 1 to 100 nm of at least 0.35 $cm^3/g$.

11. The xerogel of claim 10, wherein said silica-alumina composite sol has a total amount of elements except Si, Al, O and H, of at most 10 mol % relative to a total amount of number of atoms of Si and Al, based on a total number of atoms.

12. The xerogel of claim 10, wherein said silica-alumina composite sol has a pH of from 3 to 7.

13. The xerogel of claim 10, wherein said silica-alumina composite sol has a ζ-potential of from +30 to +90 mV.

14. The xerogel of claim 10, wherein the aggregate particles of said silica-alumina composite sol have an average particle size of from 30 to 500 nm.

15. The xerogel of claim 14, wherein the aggregate particles of said silica-alumina composite sol have an average particle size of from 30 to less than 500 nm.

16. A coating, which comprises a coating fluid applied on a polyethylene terephthalate film, wherein said coating film comprises:

(a) a silica-alumina composite sol which is a colloidal solution having aggregate particles containing silica and alumina dispersed in an aqueous medium, wherein the silica is such that primary particles thereof are spherical and have an average particle size of from 2 to 200 nm, an average particle size of the aggregate particles being at least twice the average particle size of the silica primary particles and at most 1,000 nm, and wherein the aggregate particles have a ζ-potential of at least +10 millivolts, and the colloidal solution has a pH of from 3 to 9;

(b) a polyvinyl alcohol in an amount of one part by weight per 10 parts by weight of a solid content of the composite sol, and having a total solid content concentration of 10%;

wherein a coated amount after drying is from 4.5 to 5.5 $g/m^2$ to form an ink-receiving layer, the ink-receiving layer having a color density of at least 1.0 after the ink-receiving layer is soaked in a cyan ink followed by washing with water, the ink-receiving layer having a haze value of at most 10%, and the ink-receiving layer having a 60° glossiness of at least 20% as defined by JIS Z8741.

17. The coating of claim 16, wherein the silica-alumina composite sol has a pH of from 3 to 7.

18. The coating of claim 16, wherein the silica-alumina composite sol has a total amount of elements except Si, Al, O and H, of at most 10 mol % relative to a total amount of number of a total of Si and Al, based on a total number of atoms.

19. The coating of claim 16, wherein the silica-alumina composite sol has a ζ-potential of from +30 to +90 mV.

20. The coating of claim 16, wherein the aggregate particles of the silica-alumina composite sol have an average particle size of from 30 to 500 nm.

21. The coating of claim 20, wherein the aggregate particles of the silica-alumina composite sol have an average particle size of from 30 to less than 500 nm.

22. A recording medium, comprising a porous layer obtained by coating and drying the silica-alumina composite sol of claim 4, on a substrate.

* * * * *